(12) United States Patent
Grosz et al.

(10) Patent No.: US 7,099,594 B2
(45) Date of Patent: Aug. 29, 2006

(54) OPTICAL TRANSMISSION USING ALL-OPTICAL REGENERATION AND DISPERSION TECHNIQUES

(75) Inventors: Diego F. Grosz, Middletown, NJ (US); Stefan Hunsche, Jersey City, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 764 days.

(21) Appl. No.: 10/119,080

(22) Filed: Apr. 9, 2002

(65) Prior Publication Data

US 2004/0208610 A1  Oct. 21, 2004

(51) Int. Cl.
*H04B 10/16* (2006.01)

(52) U.S. Cl. ............... 398/175; 398/173; 398/176; 398/178

(58) Field of Classification Search ........ 398/173–181, 398/183; 359/124, 337
See application file for complete search history.

(56) References Cited

U.S. PATENT DOCUMENTS

| | | | |
|---|---|---|---|
| 6,141,129 A | 10/2000 | Mamyshev | 359/176 |
| 6,337,756 B1* | 1/2002 | Djupsjobacka | 398/183 |
| 6,807,378 B1* | 10/2004 | Pincemin | 398/175 |
| 6,859,307 B1* | 2/2005 | Takeda et al. | 359/337 |
| 2001/0028489 A1* | 10/2001 | Ishikawa et al. | 359/124 |

OTHER PUBLICATIONS

"10 Gbit/s Soliton Data Transmission Over One Million Kilometres," M. Nakazawa et al., Electronics Letters 27, 1270-1272 (1991).
"All Optical Signal Regenerator," J. K. Lucek et al., Optics Letters 13, 1226-1228 (1993).
"Nonlinear-Optical Loop Mirror," N.J. Doran et al., Optics Letters 13, 56-58 (1988).

* cited by examiner

*Primary Examiner*—David C. Payne (57) ABSTRACT

The present invention generally provides optical signal transmission system having an optical signal source, at least one optical signal regenerator in series communication with the optical signal source via an optical signal communications medium, a dispersion module in series communication with the at least one optical signal regenerator via the optical signal communications medium, and a receiver in serial communication with the dispersion module via the optical signal communications medium. The dispersion compensation module inserts an amount of lumped dispersion into the system, which operates to improve the signal transmission characteristics.

16 Claims, 8 Drawing Sheets

OPTICAL TRANSMISSION USING ALL-OPTICAL REGENERATION AND DISPERSION TECHNIQUES

BACKGROUND OF THE INVENTION

1. Field of the Invention

The present invention generally relates to regeneration of an optical signal in an optical signal transmission system. More particularly, the present invention relates to an improved optical signal regenerator configuration for an optical signal transmission network.

2. Background of the Related Art

Although a number of data transmission technologies are widely used throughout the world, optically based signal/data transmission systems are quickly becoming a preferred transmission method, as optical transmission systems provide performance and economic advantages not generally available from conventional transmission systems and methods. For example, optical signal transmission systems and methods generally provide a comparative signal carrying capacity that is unmatched by conventional transmission systems and methods and, therefore, optical signal transmission networks are an attractive replacement for conventional long and short haul-type transmission systems.

In long haul-type optical transmission systems, for example, a digital optical signal is generally generated at a first location and transmitted to a second location through an extended optical transmission medium, such as a fiber optic cable network, for example. However, in view of the long haul transmission distance, the optical signal may be refreshed one or more times during the transmission process through the network or medium, such as whenever a digital optical signal is generated, transmitted, switched, multiplexed, demultiplexed, or otherwise processed in a transmission medium or network. The optical signal invariably is subject to some degree of distortion. This distortion may result from noise in the system, interference from other signals in the system, the physical properties of the transmission medium, physical properties of the various inline elements of the transmission system, i.e., amplifiers, filters, etc., and other sources known to cause distortion in an optical signal transmission system. Distortion in optical transmission systems is typically cumulative, and therefore, if the original optical signal being transmitted through the system is not periodically refreshed or restored to a signal equal to or approximating the original signal, then the optical signal may become riddled with errors or become completely incomprehensible when received at the receiving end.

In order to address this issue, optical regenerators are typically utilized to provide restoration of optical signals in an optical signal transmission network during the long haul transmission process. Optical regenerators may be positioned at predetermined distances along the long haul optical signal transmission medium, and may operate to regenerate the optical signal before the signal degrades beyond recognition. Typically, optical regenerators are complicated and expensive opto-electronic devices, wherein an optical signal is converted into an electrical signal, the electrical signal is then amplified and restored/filtered to approximate the original signal, and then the electrical signal is converted back to an optical signal and is transmitted through the next segment of the haul distance to either another regenerator or a receiver, for example. However, currently, all-optical regenerators are emerging as a technology that that does not require conversion of the optical signal into an electrical signal for the signal restoration process. In all-optical regenerators the received optical signal itself is regenerated without conversion to an electrical signal. In a published letter entitled "10 Gbit/s Soliton Data Transmission Over One Million Kilometers," M. Nakazawa, E. Yamada, H. Kubota, and K. Suzuki, Electronics Letters 27, 1270–1272 (1991) a method is suggested in which in-line amplitude modulation of a signal at the bit-rate frequency acts as a regenerator distributed over the transmission line (local clock recovery is required in conjunction with this technique). Further, a published letter entitled "All-Optical Signal Regenerator," J. K. Lucek and K. Smith, Optics Letters 13, 1226–1228 (1993) demonstrates a method for all-optical data regeneration (also requiring local clock recovery) utilizing a nonlinear optical loop mirror as described in "Nonlinear-Optical Loop Mirror," N. J. Doran and D. Wood, Optics Letters 13, 56–58 (1988).

Additionally, commonly assigned U.S. Pat. No. 6,141,129 to Mamyshev, for example, generally discloses an all optical signal regeneration apparatus and method that may be utilized for all-optical regeneration of return-to-zero (RZ) data streams. The apparatus and method disclosed by Mamyshev may be applicable to soliton as well as non-soliton pulses and is generally capable of operation without the use of local clock recovery, which was also required by previous optio-electronic regenerator systems. Mamyshev accomplishes these advantages through utilization of the effect of self-phase modulation (SPM) of an optical data signal in a nonlinear medium (NLM) to provide a spectral broadening of individual data pulses. The broadened pulses are subsequently bandwidth filtered, and therefore, only the pulses within a selected bandwidth range centered at a predetermined frequency pass through the filter. The predetermined frequency is generally shifted with respect to the input signal carrier frequency, and therefore, since the degree of broadening of an optical pulse passing through the NLM is generally a function of the initial intensity of the pulse, a large portion of the noise in signal zeros or null values will then possess insufficient intensity to cause the requisite amount of spectral broadening to encompass the selected filter bandwidth centered around the predetermined frequency. As a result thereof, a portion of the noise is suppressed. Conversely, noise (amplitude fluctuations) in signal ones or set values generally possess sufficient intensity to cause the requisite amount of spectral broadening to encompass the selected filter bandwidth centered around the predetermined frequency. As a result thereof, the portion of the spectrally broadened pulse contained within the bandwidth centered around the predetermined frequency is generally passed through the filter. Thus, the end result is a regenerated and filtered signal.

Although the method and device of Mamyshev generally provides an inexpensive and easily produced first generation optical regenerator, Mamyshev's optical regenerator is prone to passing noise through the filter when the noise is centered proximate a filtering frequency and has a sufficient magnitude. When this type of noise is passed through the optical regenerator, false set values are produced in the regenerated output. Therefore, there is a need for an improved optical regenerator capable of filtering noise and producing a regenerated output that accurately represents a source optical signal.

SUMMARY OF THE INVENTION

Embodiments of the present invention generally provide an apparatus comprising at least one optical signal regenerator, for receiving a signal from an optical signal source via an optical signal communications medium; and a dispersion module, in series communication with the at least one optical signal regenerator via the optical signal communications medium for providing a regenerated optical signal to a receiver. The dispersion compensation module inserts an amount of lumped dispersion into the system, which operates to improve the signal transmission characteristics.

Embodiments of the invention further provide an optical transmission system having an optical signal regenerator configured to receive an optical signal from an optical signal transmission medium, and an optical signal receiver in optical communication with the optical signal receiver via the optical signal transmission medium. The optical transmission system further includes a dispersion device positioned between the optical signal regenerator and the optical signal receiver inline with the optical signal transmission medium, the dispersion device being configured to insert an amount of negative lumped dispersion into the optical signal transmission medium.

Embodiments of the invention further provide a method for transmitting optical signals, wherein the method includes receiving an optical signal in an optical signal regenerator and regenerating the transmitted optical signal. The method further includes adding negative lumped dispersion to the regenerated optical signal and receiving the regenerated optical signal in a receiver.

BRIEF DESCRIPTION OF THE DRAWINGS

So that the manner in which the above-recited features of the invention are obtained may be understood in detail, a more particular description of the invention may be had by reference to the exemplary embodiments thereof, which are illustrated in the appended drawings. It is to be noted, however, that the appended drawings illustrate only typical or exemplary embodiments of the invention, and are therefore, not to be considered limiting on the scope of the invention, as other embodiments of the invention may be derived without departing from the scope thereof.

DETAILED DESCRIPTION OF THE PREFERRED EMBODIMENT

Figure 1:
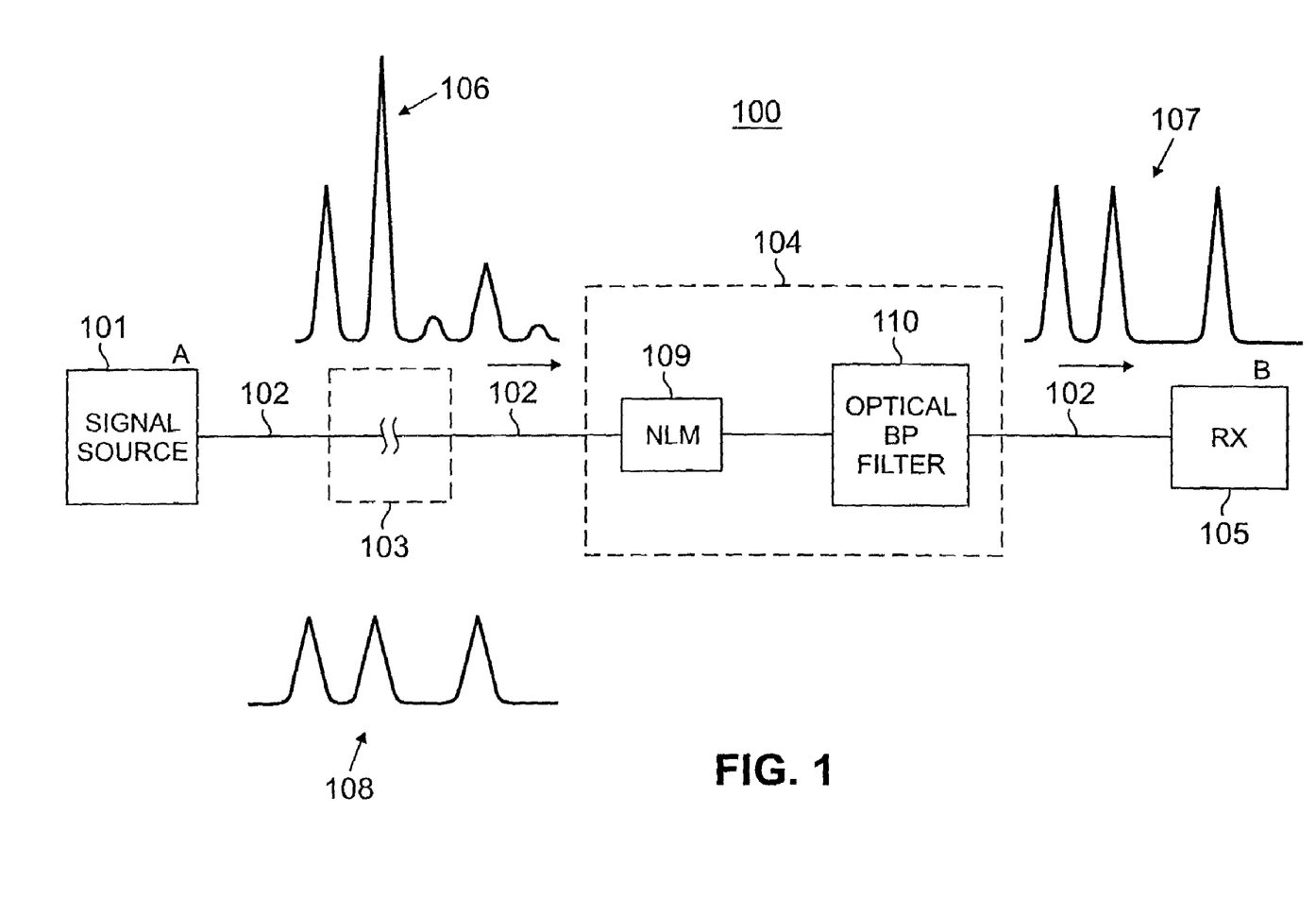
FIG. 1 illustrates an exemplary optical signal transmission system of the invention.

FIG. 1 illustrates an exemplary optical signal transmission system 100 of the invention, wherein system 100 may be configured to transmit optical signals over various distances, including long haul and ultra-long haul distances.

The optical signal transmission system 100 of FIG. 1 is illustrated as a return-to-zero (RZ) type system, i.e., wherein the optical signal increases or decreases to a "set" digital logic value of either +1 or 0 and then returns to zero between the respective set values on the bit intervals. RZ type systems are characterized by a bit stream having a $\sin(x)/x$ spectrum resembling non-return-to-zero (NRZ) formats, except that spectral nulls or zero logic states do not occur at every non-zero integer multiple of the bit rate. The location of the zeros generally depends on the duty cycle of the pulse, as does the peak spectral density and the total signal energy. Further, if an RZ type signal returns to zero halfway through the bit, then the spectral zeros generally occur at non-zero even multiples of the data rate, i.e., at 2×, 4×, 6×, etc., and the total energy in the RZ signal will generally be one half that of a corresponding NRZ signal. Correspondingly, the spectral density of the RZ signal will generally be one quarter that of the NRZ signal, as one half as much total power is being spread over twice the bandwidth of the signal. Although embodiments of the invention are illustrated using an RZ format, the invention is not intended to be limited thereto, as it is contemplated that other optical data transmission formats may be utilized with similar effectiveness.

System 100 generally includes an optical signal source 101 in optical communication with an optical signal transmission medium 102. The optical source 101 may be one of many elements commonly used in optical signal transmission methods, such as an optical transmitter device comprising an optical laser in communication with modulator and at least one optical amplifier, for example. Optical signal source 101 is generally configured to generate an optical signal, such as the exemplary RZ type optical signal 108. The optical signal transmission medium 102 may be a fiber optic strand within a fiber optic cable bundle, for example. The optical transmission medium 102 is generally configured to receive the optical signal 108 and transmit the signal from a source point "A" to a destination point "B". Generally, the linear distance from point A to point B may be a long haul or ultra long haul-type distance, i.e., distances that may be used in inter-LATA, interstate, and/or international communications systems, for example.

In view of the long haul signal transmission distance between point A and point B, the source optical signal 108 typically degrades as it travels through optical signal transmission medium 102. The source optical signal 108 may disperse and/or pick up noise during the transmission process as a result of inherent system distortion sources 103, which may alter or distort the source optical signal 108 to look like transmitted optical signal 106, for example. Exemplary sources of signal distortion may be the transmission medium 102, inline switching elements, optical couplings, optical multiplexers, optical demultiplexers, or other devices known to those skilled in the art of optical signal transmission to cause signal degradation, for example. Generally, the level of distortion/degradation of the transmitted optical signal 106 is roughly proportionate to the linear distance traveled through optical transmission medium 102, and therefore, after source signal 108 has traveled through a certain distance of optical signal transmission medium 102, the signal becomes critically distorted, i.e., the signal becomes incomprehensible at the receiving end. Therefore, an optical signal regenerator 104 is generally positioned inline with the optical signal transmission medium 102 at a linear point in medium 102 where the optical signal has not yet degraded to the point of incomprehensibility. The optical signal regenerator 104 generally operates to filter and amplify the transmitted (distorted/degraded) optical signal 106, such that the resulting output signal 107 generally mirrors the source optical signal 108.

The optical signal regenerator 104 of the present invention may be an all-optical-type regenerator, i.e., regenerator 104 may not be required to convert optical signals received therein into an electrical format in order to filter and/or amplify the signal to generate the output therefrom. The exemplary regenerator 104, for example, may include a nonlinear medium (NLM) 109 in series optical communication with an optical regenerator bandpass filter (ORBPF) 110. In this configuration, the transmitted optical signal 106 may be received in regenerator 104 via NLM 109, and then transmitted from NLM 109 to ORBPF 110. The center frequency of the ORBPF 110 is generally selected to be a frequency approximate the carrier frequency of the source signal 108, which allows regenerator 104 to smooth zeros and reduce noise in set logic states. The output of ORBPF 110 is then in communication with the output of regenerator 104, and as a result of ORBPF 110, the resulting output signal 107 produced by regenerator 104 generally approximates the source signal 108 output from the source 101 at point A of system 100. The resulting output signal 107 is then communicated to an optical signal-receiving device 105 via an additional length of the optical signal transmission medium 102.

Figure 2:
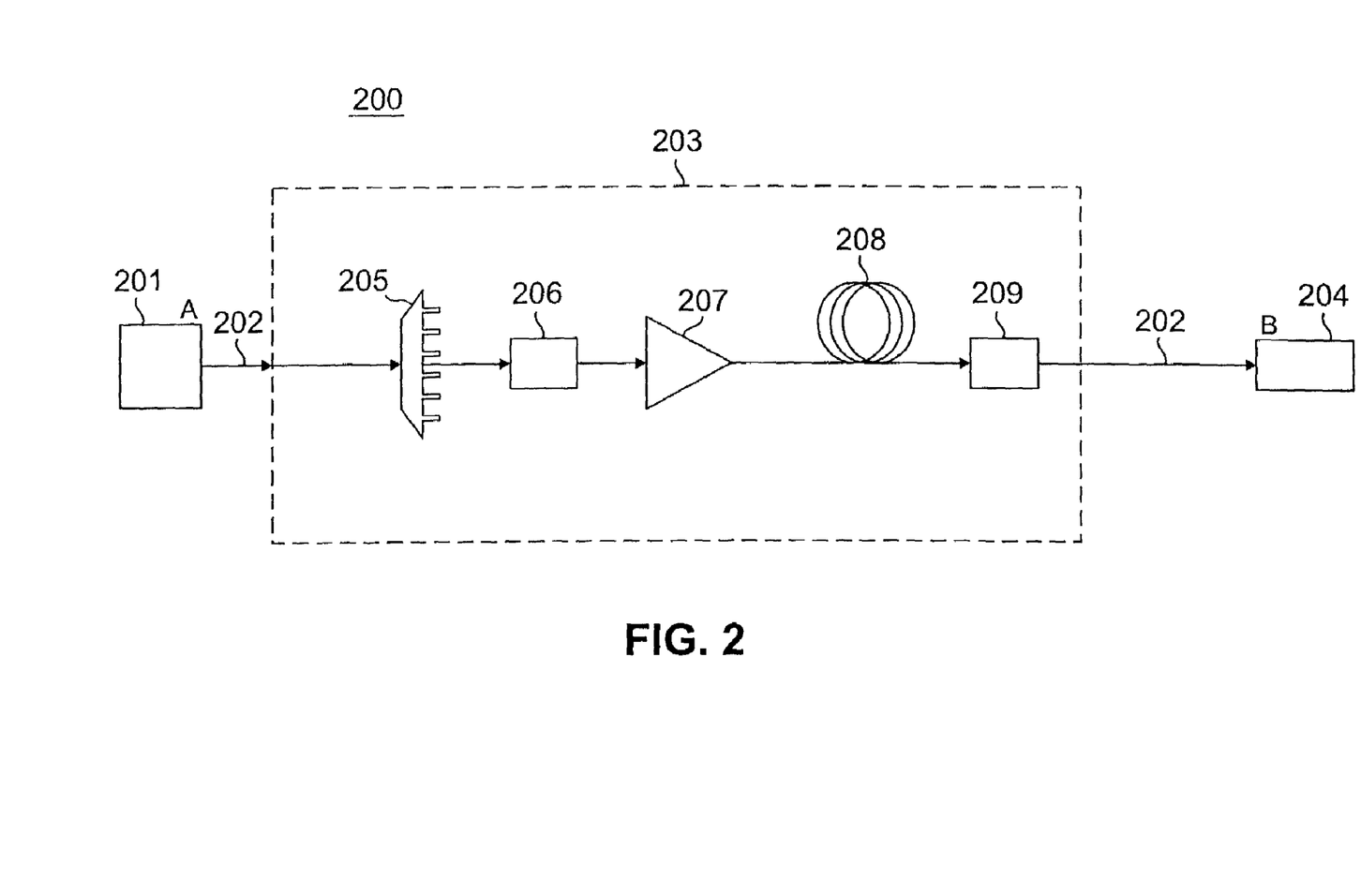
FIG. 2 illustrates another embodiment of an optical signal transmission system of the invention.
Figure 3:
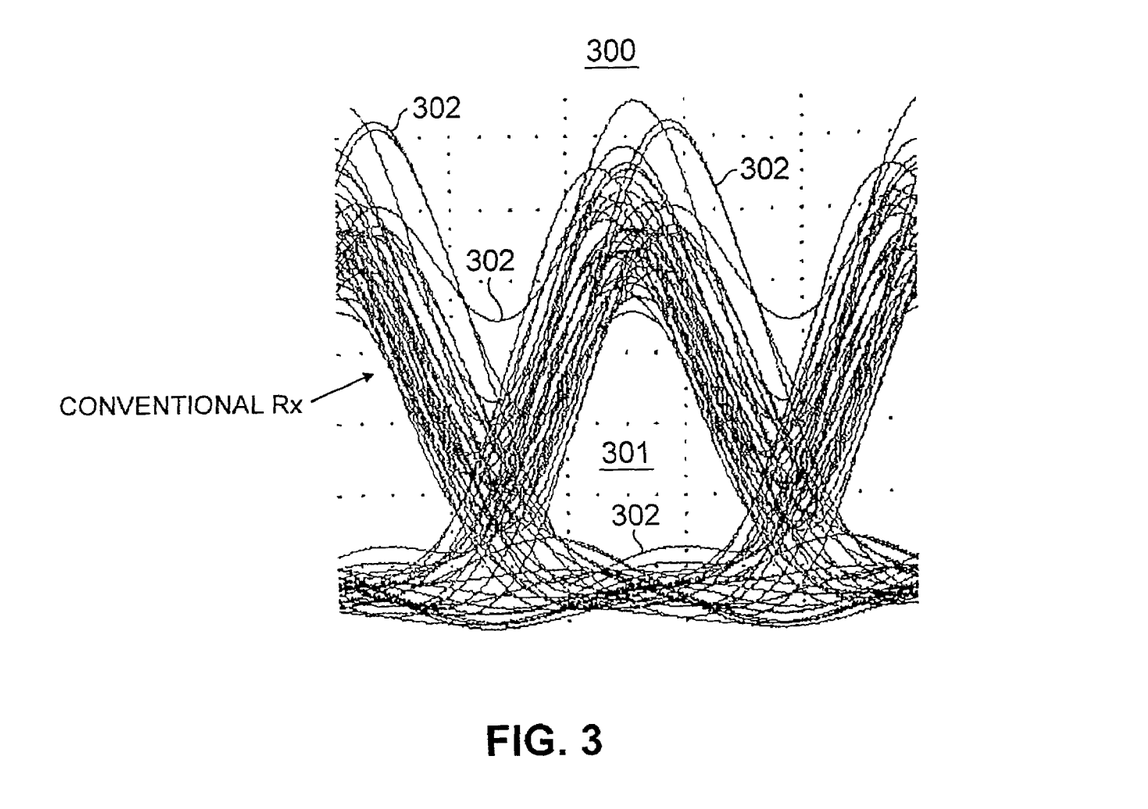
FIG. 3 illustrates a multiplexed optical signal pulse train of the invention.

FIG. 2 illustrates another embodiment of an optical signal transmission system 200 of the invention. System 200 may generally be configured to transmit optical signals between a source point A and a receiving point B, wherein the transmission distance between points A and B may be a long haul or an ultra long haul distance, as is known in the optical signal transmission art. The optical signal transmitted by system 200 may originate in an optical signal source 201. Source 201 may, for example, generate a multiplexed optical signal pulse train 300, as illustrated in FIG. 3. Pulse train 300 may include a plurality of phase synchronized optical signals traveling in a unitary optical signal transmission medium, wherein each of the individual optical signals traveling therein includes a predetermined sequence of null/zero values 301 and set values 302. The optical pulse train 300 generated by source 201 is communicated to an optical signal transmission medium 202, which is configured to transmit the optical signal received therein between points A and B. However, in view of the noise and/or distortion that inherently accompanies long haul or ultra long haul optical signal transmission processes, one or more optical signal regenerators 203 may be positioned in-line with the optical signal transmission medium 202 in order to regenerate/refresh the optical pulse train 300 as the distortion and noise increasingly degrades pulse train 300.

The optical signal regenerator 203 generally includes a demultiplexer 205 that receives the pulse train 300 as an input. Demultiplexer 205 demultiplexes pulse train 300 and communicates the demultiplexed pulse train 300 to a pre-filter 206, which operates as a first stage filtering of pulse train 300 for removal of the noise and/or distortion therefrom. The output of pre-filter 206 is in communication with the input of and optical signal amplifier 207, which operates to boost the intensity of the optical signal being transmitted therethrough. The output of the optical signal amplifier 207 is in communication with a nonlinear fiber device 208 such as a high nonlinear fiber device (or semiconductor optical amplifier operating to impart a similar temporal and/or spectral function to the signal), which operates to self phase modulate and spectrally broaden the pulse train 300. The high nonlinear fiber device 208 communicates the optical signal to a shifted filter 209, which is in optical communication with the output of the optical signal regenerator 203. The output of the optical signal regenerator 203, which is generally in communication with an additional strand of the optical signal transmission medium 202, communicates the regenerated pulse train 300 to a receiving element 204 positioned at a terminating end of system 200.

The above-mentioned high nonlinear fiber (HNLF) comprises an optical fiber having a small effective area, typically around 11 microns squared, and small negative dispersion (d<0). The effect of the small effective area is an increase in intensity, which improves the nonlinear effects within the HNLF.

In another embodiment of the invention, the optical signal regenerator 203 illustrated in FIG. 2 may be a 2R-type all-optical regenerator. In this embodiment, demultiplexer 205 may be a fourth Gaussian-type demultiplexer operating at 80 GHz at 3 dB, for example. The pre-filter 206 may be a second Gaussian pre-filter device operating at 120 GHz at 3 dB, for example. The optical signal amplifier 207 may be an erbium-doped fiber amplifier (EDFA), which essentially operates as an optical repeater device configured to boost the intensity of the optical signal traveling therethrough. In a typical EDFA, an optical fiber is doped with the rare earth element erbium, so that the glass fiber can absorb light at a first frequency, while emitting light at a second frequency. In operation, the optical signal coming into the EDFA at the first frequency excites the erbium atoms in the EDFA, which then emit photons at the second frequency, which is generally selected to be the same wavelength as the source. This action operates to boost or amplify a weak optical signal to a higher power, which may be a power output of about 18 dBm, for example. The output of the EDFA communicates with a high nonlinear fiber 208, which may be a 4 km high nonlinear fiber commonly used in optical signal transmission applications, for example, to self phase modulate and spectrally broaden an optical pulse. The output of the high nonlinear fiber 208 is then communicated to an input of a second Gaussian shifted-filter 209 operating at 160 GHz at 3 dB, for example. The output of the shifted-filter 209 is then communicated to the optical signal transmission medium 202 as the output of the 2R regenerator. This output may be communicated through the optical signal transmission medium 202 to a conventional 40 Gb/s receiver 204. Receiver 204, for example, may be a fourth Bessel-type receiver operating at 24 GHz.

Figure 4:
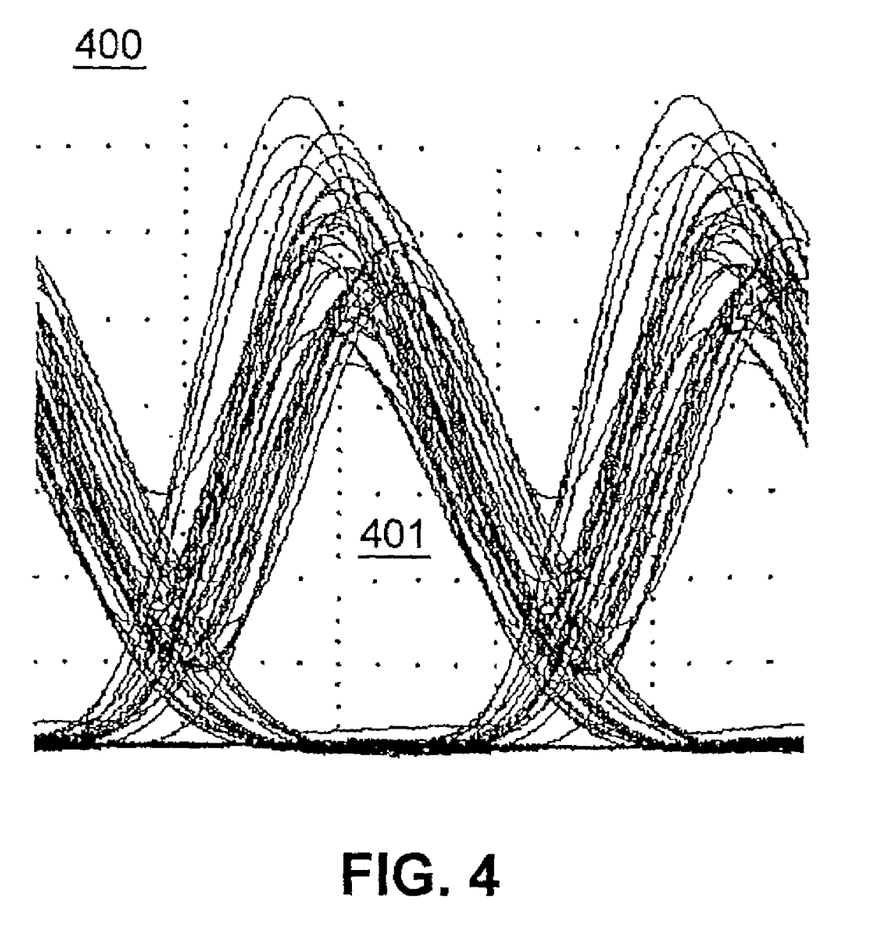
FIG. 4 illustrates a pulse train of the invention having a broadened signal eye.

In operation, the 2R-type all optical regenerator operating in conjunction with the fourth Bessel-type receiver operating at 24 GHz operates to improve the optical signal transmission eye. For example, FIG. 3 illustrates an optical transmission signal pulse train 300 using a conventional receiver configuration. The conventional optical signal 300 defines a signal eye 301, however, the signal eye 301 is narrowed or confined by a plurality of noise or distortion elements 302. This confinement and/or narrowing effect reduces system performance, margin, Q value, and therefore, is undesirable. However, when the 2R optical regenerator and receiver combination noted above is implemented, the signal eye 401 of the optical signal pulse train 400 broadens substantially, as illustrated in FIG. 4. The broadened eye 401 provides greater system margin, which directly translates to increased performance characteristics for the same reach type systems, or alternatively, the same performance characteristics for extended reach systems. Thus, the 2R optical regenerator and receiver combination of the invention may be implemented on current systems to increase system performance, or alternatively, the 2R optical regenerator and receiver combination of the invention may be implemented in new systems and utilized to increase transmission distance, while maintaining system performance and not requiring additional system elements. Further, the broadened eye and/or improved Q factor provides an improved bit error rate over conventional transmission systems.

Figure 5:
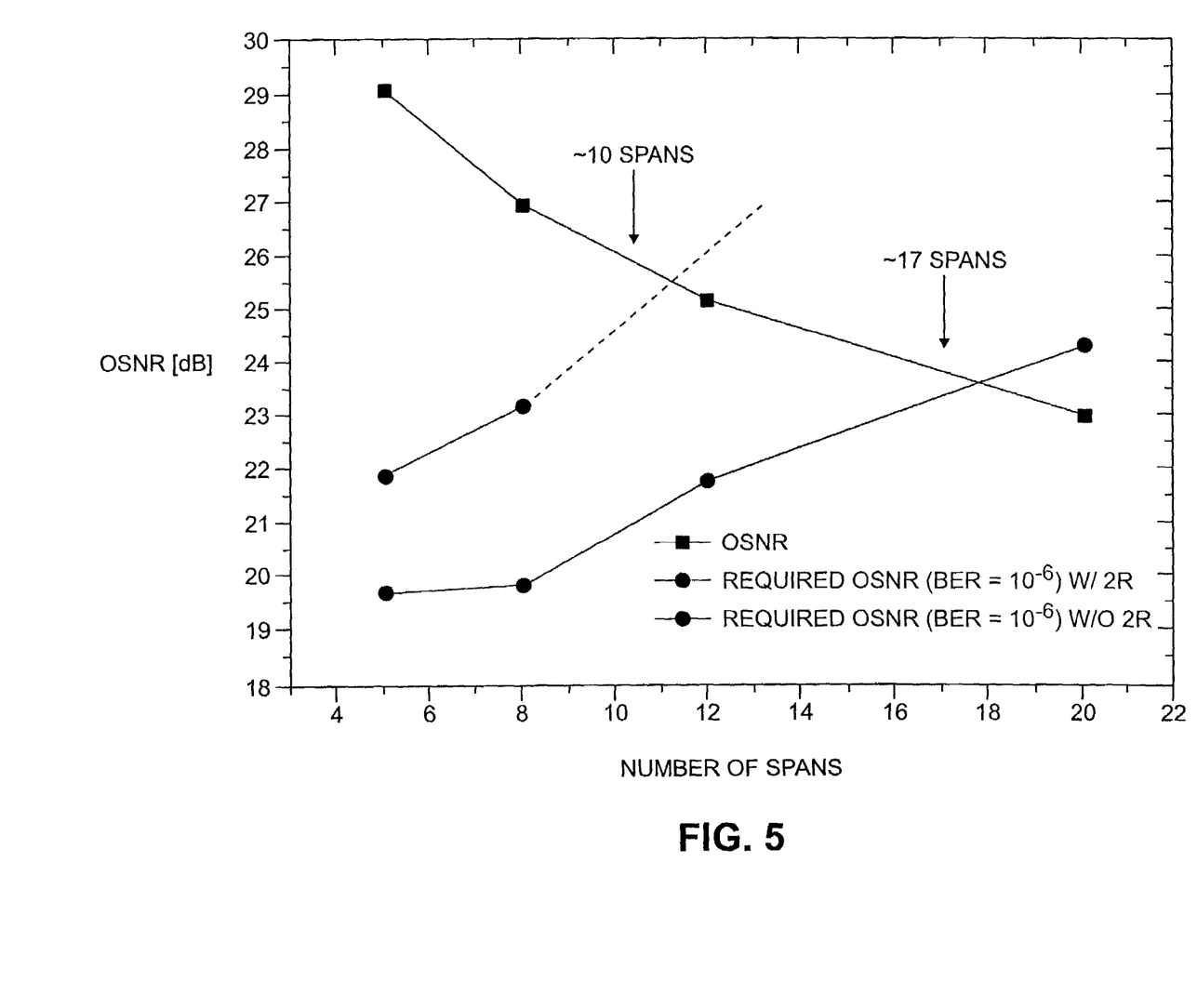
FIG. 5 illustrates experimental data representing an exemplary correlation between the optical signal-to-noise ratio (OSNR) in an optical signal transmission system and the number of standard fiber spans that may be implemented in an optical signal transmission medium between regenerations.

FIG. 5 illustrates experimental data representing an exemplary correlation between the optical signal-to-noise ratio (OSNR) in an optical signal transmission system and the number of standard fiber spans that may be implemented in an optical signal transmission medium between regenerations, i.e., how far the optical signal may travel through the optical signal transmission medium (spans) before requiring regeneration. Without regeneration, FIG. 5 indicates that an optical signal may travel approximately 10 spans before requiring regeneration. However, when the 2R optical regenerator and receiver configuration of the invention is implemented, FIG. 5 illustrates that the optical signal may travel approximately seventeen spans prior to requiring optical signal regeneration. Therefore, the experimental data of FIG. 5 indicates that the regenerator/receiver combination of the present invention may operate to increase span transmission lengths by approximately 70 percent over conventional configurations. Alternatively, if the span length remains constant, then the improved signal transmission qualities provided by the 2R all-optical regenerator and receiver combination offers improved Q factors over conventional optical signal transmission systems. As a result of the improvement in these parameters, the optical signal transmission medium employing the regenerator and receiver configuration of the present invention are capable of providing an increased signal throughput rate over conventional devices.

Figure 6:
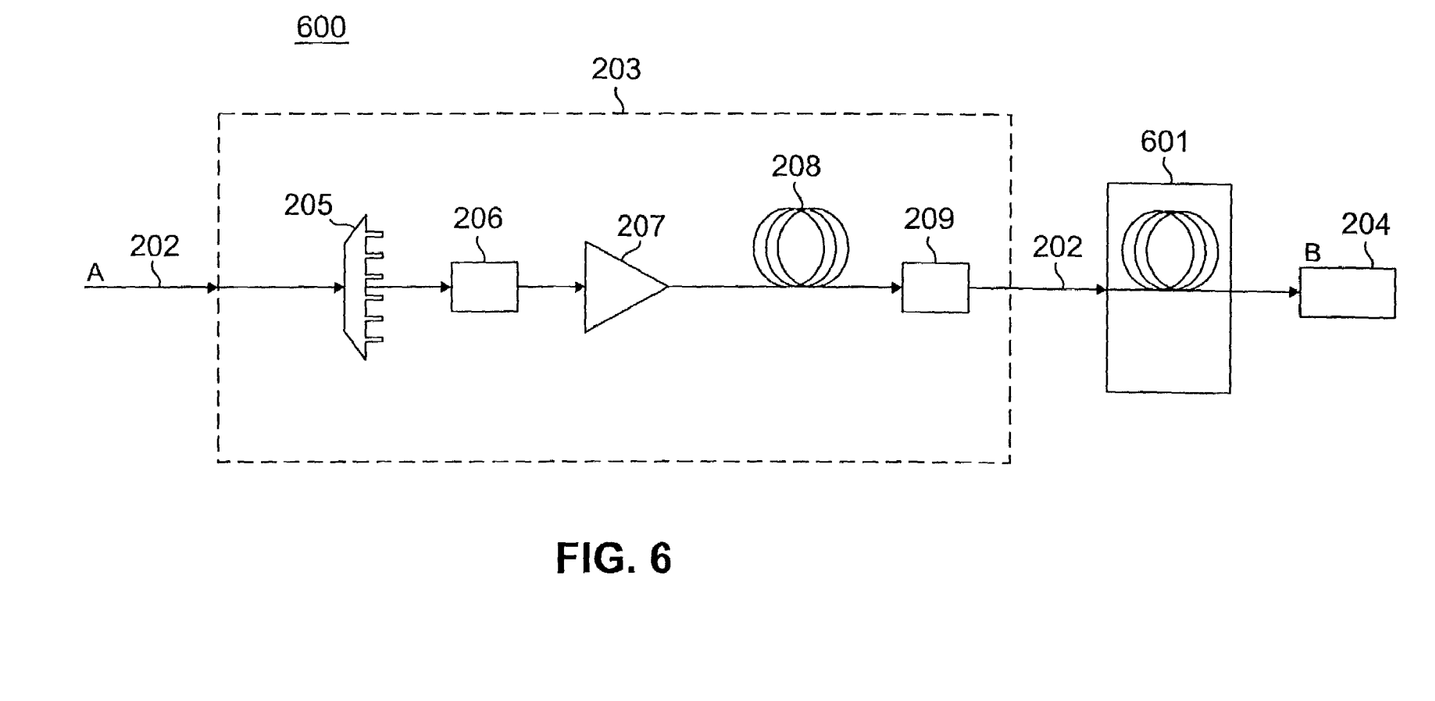
FIG. 6 illustrates another embodiment of an exemplary transmission system of the invention.

In another embodiment of the invention, an alternative/improved configuration of the 2R regenerator and receiver system noted above is provided. The alternative configuration, which is illustrated as system 600 in FIG. 6, generally includes the elements of optical system 200 illustrated in FIG. 2, however, improved system 600 further includes a dispersion module 601 positioned between the output of the all optical regenerator 203 and the input of the optical signal receiver 204. Dispersion module 601 is generally configured as an in-line component, i.e., dispersion module 601 is positioned in-line with the optical signal transmission medium 202 such that the optical pulse train being transmitted through the signal transmission medium 202 also passes through dispersion module 601. Although various method and devices for inserting lumped dispersion are contemplated within the scope of the present invention, embodiments of the invention may utilize a length of dispersion compensation fiber having a length of between about 100 meters and about 200 meters, for example, to generate and insert the lumped dispersion.

Figure 7:
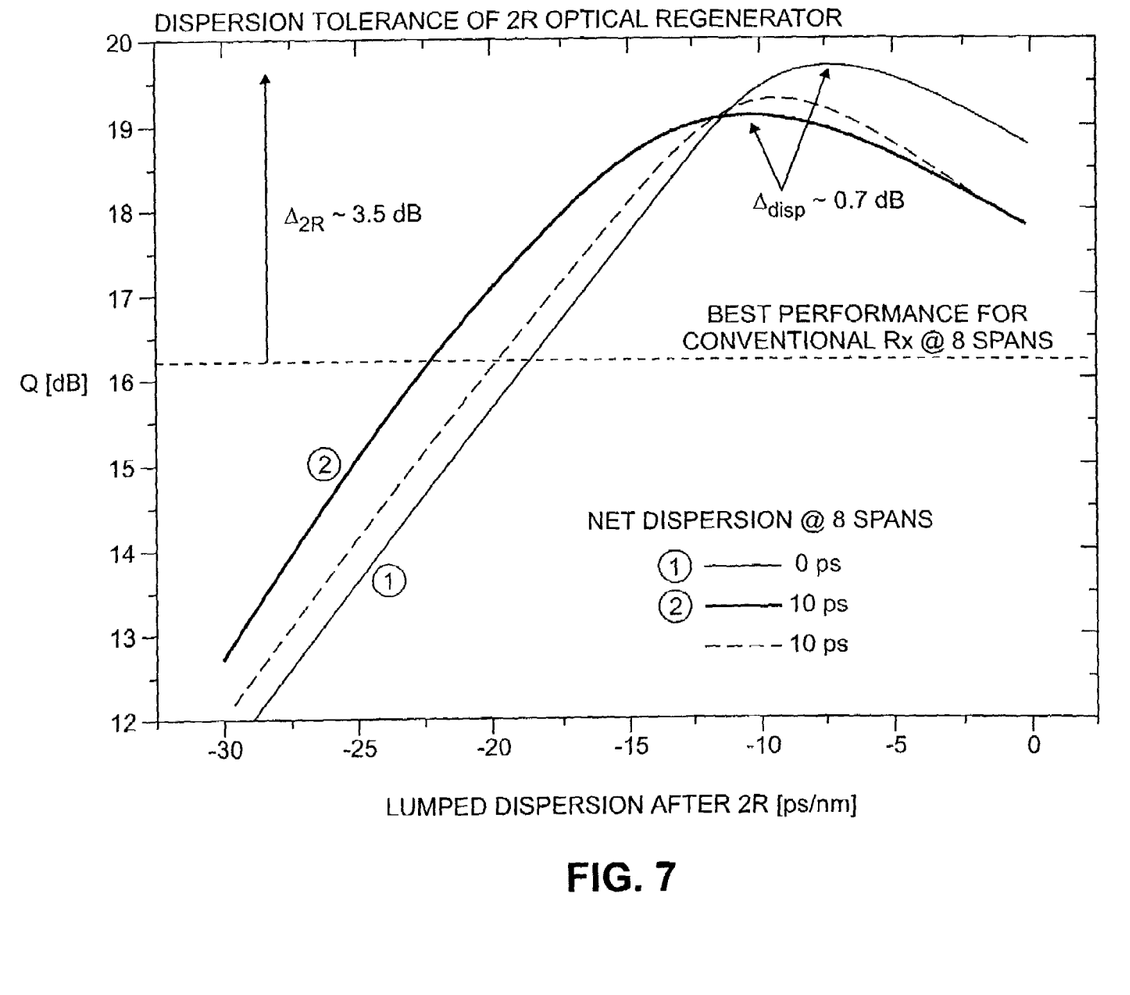
FIG. 7 illustrates exemplary test data correlating the Q-factor of the optical pulse train with the quantity of lumped dispersion inserted into the system after the pulse train exits the regenerator.

FIG. 7 illustrates exemplary test data correlating the Q-factor of the optical pulse train with the quantity of lumped dispersion inserted into the system after the pulse train exits the regenerator. The exemplary test data was taken using a standard eight span fiber optic transmission system. As illustrated in FIG. 7, with a zero net dispersion, the Q-factor peaked at approximately 19.7 when about −7.5 ps/nm lumped dispersion was inserted into the pulse train by the dispersion module 601. Similarly, when the net dispersion of the optical signal pulse train was measured at 10 ps, the Q-factor peaked at approximately 19.0 when about −11 ps/nm of lumped dispersion was inserted into the pulse train by the dispersion module 601. Further still, when the net dispersion was measured at negative 10 ps, insertion of lump dispersion of approximately −9 ps/nm generated a Q-factor of approximately 19.4. Therefore, insertion of the lumped dispersion into the optical signal pulse train by the apparatus of the present invention leads to performance improvements, better tolerance to pulse distortion coming into the regenerator, and improves margin in terms of the booster/amplifier power required in the optical regenerator. Further, the insertion of negative lumped dispersion operates to make the combination of the 2R receiver and the receiver more tolerant to operation away from optimum points as a result of the shifting ability of the lumped dispersion.

Figure 8:
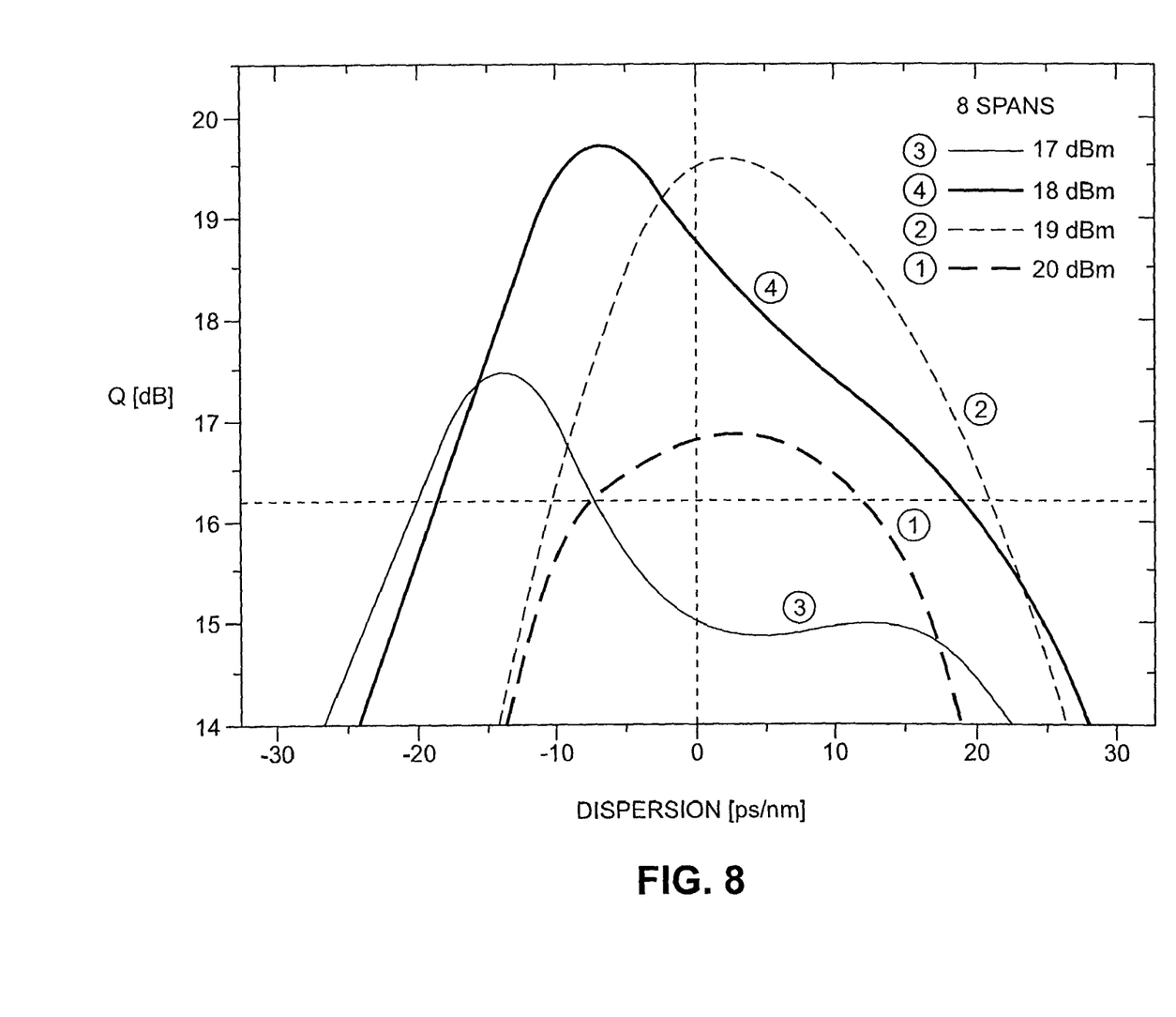
FIG. 8 illustrates exemplary test data correlating the Q-factor directly to the dispersion inserted into the optical signal transmission medium.

FIG. 8 illustrates exemplary test data correlating the Q-factor directly to the dispersion inserted into the optical signal transmission medium. For example, with 20 dBm of output power from the amplifier in an 8 span system, insertion of zero lumped dispersion after the regenerator produces a maximum Q-factor of approximately 16.7. When the net dispersion is 19 ps/nm for an eight span system, a slight amount of lumped dispersion generates a Q-factor of approximately 19.7. When the net dispersion is 18 ps/nm, then the Q-factor with zero lumped dispersion inserted into the system is approximately 18.5. However, if a portion of negative lumped dispersion totaling approximately −10 ps/nm is inserted into the optical signal transmission medium, then the Q-factor is increased from 18.5 to approximately 19.7 as a result of the phase shift generated by the insertion of the lumped dispersion into the optical signal transmission medium. Similarly, if 17 ps/nm of net dispersion is present, then the Q-factor without any lumped dispersion is approximately 15, however, if lumped dispersion of −15 ps/nm is inserted in the optical signal transmission medium, then the Q-factor factor is increased to approximately 17.5. Therefore, the experimental data illustrated in FIG. 8 indicates that the Q-factor for various optical signal transmission mediums may be optimized through in insertion of a quantity of lumped dispersion into the optical signal transmission medium at a point downstream from the optical regenerator and upstream from the optical receiver. Further, for common optical signal transmission medium net dispersion quantities, i.e., between about 15 ps/nm and about 22 ps/nm, the quantity of lumped dispersion required to optimize the Q-factor is generally between about −8 ps/nm and about −15 ps/nm for the apparatus of the present invention.

While foregoing description is directed to exemplary embodiments of the present invention, other and further embodiments of the invention may be devised without departing from the basic scope thereof, wherein the scope of the present invention is determined by the claims that follow.

The invention claimed is:

1. Apparatus, comprising:
   at least one optical signal regenerator for receiving an optical signal via an optical signal communications medium; and
   a dispersion module in series communication with the at least one optical signal regenerator for providing a regenerated optical signal.
   wherein the at least one optical signal regenerator comprises:

a demultiplexer in series optical communication with an input to the at least one optical regenerator;

a pre-filter in series optical communication with an output of the demultiplexer;

an optical signal amplifier in series optical communication with an output of the pre-filter;

a nonlinear fiber device in series optical communication with an output of the optical signal amplifier; and a shifted-filter in series optical communication with an output of the nonlinear fiber device.

2. The apparatus of claim 1, wherein the nonlinear fiber device comprises a high nonlinear fiber device.

3. The apparatus of claim 1, wherein the demultiplexer comprises a fourth Gaussian demultiplexer operating at about 80 GHz at about 3 dB.

4. The apparatus of claim 1, wherein the pre-filter comprises a second Gaussian filter operating at about 120 GHz at about 3 dB.

5. The apparatus of claim 1, wherein the optical signal amplifier comprises an erbium-doped fiber amplifier generating a power output of about 18 dBm.

6. The apparatus of claim 2, wherein the high nonlinear fiber device comprises about a 4 km high non-linear fiber device.

7. The apparatus of claim 1, wherein the shifter filter comprises a second Gaussian shifter filter operating at about 160 GHz at about 3 dB.

8. The apparatus of claim 1, wherein the receiver comprises a fourth Bessel-type receiver configured to operate at about 24 GHz.

9. The apparatus of claim 1, wherein the dispersion module comprises a length of dispersion compensation fiber, wherein the length is between about 100 meters and about 200 meters.

10. The apparatus of claim 1, wherein the dispersion module is configured to generate negative lumped dispersion in the optical signal communications medium.

11. The apparatus of claim 10, wherein the negative lumped dispersion is between about −8 ps/nm and about −15 ps/nm.

12. The apparatus of claim 10, wherein the negative lumped dispersion is calculated to optimize a Q value of an optical pulse train.

13. A method for transmitting optical signals, comprising:
regenerating a received optical signal; and
adding negative lumped dispersion to the regenerated optical signal;
wherein regenerating the optical signal comprises:
receiving the optical signal in an all optical 2R optical regenerator;
demultiplexing the optical signal;
pre-filtering the optical signal;
amplifying the optical signal;
passing the optical signal through a nonlinear fiber; and
filtering the optical signal with a shifted-filter.

14. The method of claim 13, wherein said nonlinear fiber comprises a high nonlinear fiber.

15. The method of claim 13, wherein adding negative lumped dispersion comprises adding between about−8 ps/nm and about—15 ps/nm of lumped dispersion to the regenerated optical signal prior to the signal being received by the receiver.

16. The method of claim 13, wherein adding the negative lumped dispersion operates to increase receiver tolerance to pulse distortion.

* * * * *